(12) United States Patent
Amtmann (10) Patent No.: US 7,834,742 B2
(45) Date of Patent: Nov. 16, 2010

(54) METHOD OF INVENTORYING TRANSPONDERS BY MEANS OF A COMMUNICATION STATION

(75) Inventor: Franz Amtmann, Graz (AT)

(73) Assignee: NXP B.V., Eindhoven (NL)

( * ) Notice: Subject to any disclaimer, the term of this patent is extended or adjusted under 35 U.S.C. 154(b) by 805 days.

(21) Appl. No.: 10/525,810

(22) PCT Filed: Aug. 5, 2003

(86) PCT No.: PCT/IB03/03491

§ 371 (c)(1),
(2), (4) Date: Sep. 2, 2005

(87) PCT Pub. No.: WO2004/021257

PCT Pub. Date: Mar. 11, 2004

(65) Prior Publication Data

US 2006/0109086 A1      May 25, 2006

(30) Foreign Application Priority Data

Aug. 28, 2002   (EP)   ................................. 02102231

(51) Int. Cl.
*H04Q 5/22* (2006.01)
(52) U.S. Cl. .................... 340/10.3; 340/10.1; 340/5.92; 340/572.1
(58) Field of Classification Search ................ 340/10.3, 340/572.1, 10.34, 10.33, 5.92, 10.1, 10.2, 340/10.4, 10.42, 10.41
See application file for complete search history.

(56) References Cited

U.S. PATENT DOCUMENTS

| 5,266,925 | A  | * | 11/1993 | Vercellotti et al. | ........... 340/505 |
| 5,550,547 | A  | * | 8/1996  | Chan et al.        | ..................... 342/42 |
| 5,883,582 | A  | * | 3/1999  | Bowers et al.      | ............. 340/10.2 |
| 6,172,596 | B1 | * | 1/2001  | Cesar et al.       | .............. 340/10.41 |
| 6,323,566 | B1 | * | 11/2001 | Meier              | ......................... 307/10.2 |
| 6,486,769 | B1 | * | 11/2002 | McLean             | .................. 340/10.32 |
| 6,633,227 | B1 | * | 10/2003 | Schmitz            | ................... 340/10.31 |
| 6,650,228 | B1 | * | 11/2003 | Vacherand et al.   | ....... 340/10.33 |
| 7,005,985 | B1 | * | 2/2006  | Steeves            | .................... 340/572.1 |
| 7,084,769 | B2 | * | 8/2006  | Bauer et al.       | .............. 340/572.7 |

* cited by examiner

*Primary Examiner*—Brian A Zimmerman
*Assistant Examiner*—Yong Hang Jiang (57) ABSTRACT

In a method of inventorying a plurality of transponders (2) by means of a communication station (1) communicating with the transponders (2) in contactless manner, the communication station (1) emits an unmodulated carrier signal (NMCS) in a communications range of the communication station (1) and each transponder (2) on entering the communications range then emits a presence-signaling signal (PRES) and the communication station (1) on receiving a presence-signaling signal (PRES) then emits an inventorying command signal (INVS) and each transponder (2) on receiving the inventorying command signal (INVS) then emits a response signal (RESPS) permitting inventorying of the transponder (2) and the communication station (1) on correctly receiving a response signal (RESPS) then undertakes inventorying of the relevant transponder (2).

16 Claims, 2 Drawing Sheets

METHOD OF INVENTORYING TRANSPONDERS BY MEANS OF A COMMUNICATION STATION

The invention relates to a method of inventorying at least one transponder by means of a communication station, wherein the communication station emits an unmodulated carrier signal in a communications range, and wherein the transponder subsequently emits a response signal in the communications range permitting the inventorying of the transponder.

The invention further relates to a communication station for communication with at least one transponder and for inventorying at least one transponder, wherein station transmission means are provided for emitting and receiving signals, and wherein carrier signal generating means are provided for generating an unmodulated carrier signal, the unmodulated carrier signal being emitted in a communications range by means of the station transmission means.

The invention further relates to a transponder for communication with a communication station, wherein transponder transmission means are provided for emitting and receiving signals, and wherein carrier signal detection means are provided for detecting an unmodulated carrier signal generated and emitted by the communication station and received by the transponder transmission means, and wherein response signal generating means that can be activated are provided for generating a response signal permitting the inventorying of the transponder.

The invention further relates to an integrated circuit for a transponder for communication with a communication station, wherein at least one connection is provided for emitting and receiving signals, and wherein carrier signal detection means are provided for detecting an unmodulated carrier signal generated and emitted by the communication station and received via at least one connection, and wherein response signal generating means that can be activated are provided for generating a response signal permitting the inventorying of the transponder.

A method comprising the stages already cited in the first paragraph and a communication station of the type already cited in the second paragraph and a transponder of the type already cited in the third paragraph and an integrated circuit of the type already cited in the fourth paragraph have been marketed in various type variants and are therefore known.

The known method is a so-called TTF method. The abbreviation TTF is derived from the term "Tag Talks First". In the known TTF method a communication station constantly emits an unmodulated carrier signal, which consequently does not give rise to any sidebands and each transponder present in the communications range of the communication station or entering the said communications range immediately receives this unmodulated carrier signal, the unmodulated carrier signal being used in each transponder to supply the transponder in question with energy. As soon as such a transponder has been supplied with sufficient energy, the transponder, either immediately or with a time delay, emits a response signal in the communications range which is consequently delivered to the communication station, which is advantageous with regard to a brief inventorying process. The response signal permits the inventorying of each transponder, because the response signal contains the so-called serial number of the transponder in question, the serial number being unique to and significant for each transponder. The response signal may also be formed from client-specific client data. The response signals, by and large very promptly forthcoming from all transponders present in the communications range of the communication station, are processed in the course of the inventorying procedure, also often referred to as the anti-collision procedure, for the purpose of inventorying these transponders. In the known TTF method, however, there is the problem, that if multiple transponders are present in the communications range of the communication station it is not possible to obtain a satisfactory result by means of the inventorying procedure, because the transponders present in the communications range emit their response signals asynchronously with one another and commencing at unexpected times, with the result that the response signals received by the communication station overlap one another, and therefore collide, and consequently cannot be detected clearly and correctly, so that at least one and often more than one further inventorying procedure is required, which means that overall inventorying takes a relatively long period of time, or a transponder cannot be inventoried at all—as when, for example, the transponders each connected to a suitcase are being moved through the communications range of a communication station by means of a baggage conveyor, for example. The fact that the known TTF method does not permit correct inventorying, given a plurality of transponders present in the communications range of a communication station, therefore stems from the fact that although the transponders present in the communications range generate their response signals very rapidly, they do not generate and deliver these to the communication station in a chronologically ordered fashion.

In order to avoid the problems highlighted above, a so-called RTF method has already been proposed. The abbreviation RTF is derived from the term "Reader Talks First". In the so-called RTF method the communication station periodically emits an inventorying command signal, the selected repetition frequency for the emission of the inventorying command signal being so high that each transponder entering the communications range of the communication station receives the inventorying command signal as soon as possible after entering the communications range and consequently delivers its response signal, that is the entire serial number, to the communication station. The emission of the response signal is in this case advantageously determined by the inventorying command signal, so that unwanted collisions between response signals can be easily and reliably avoided. With this RTF method, however, there is the problem that the communication station generates and emits the inventorying command signal at periodic intervals, the signal being coded and modulated according to the inventorying command. The periodically repetitive generation of the inventorying command signal, which is also referred to as "polling", unfortunately leads to sidebands with high amplitudes, which is disadvantageous with regard to official regulations intended to limit the amplitudes of sidebands in carrier signal transmission processes.

It is an object of the invention to eliminate the aforementioned problems and to provide an improved method and an improved communication station and an improved transponder and an improved integrated circuit.

In order to achieve the aforementioned object, in a method according to the invention features according to the invention are provided so that a method according to the invention may be characterized as follows:

A method of inventorying at least one transponder by means of a communication station, wherein the communication station emits an unmodulated carrier signal in a communications range, and wherein the transponder on entering the communications range emits a presence-signaling signal in the communications range, and wherein the communication station on receiving a presence-signaling signal emits an inventorying command signal in the communications range, and wherein the transponder on receiving the inventorying command signal emits a response signal in the communications range permitting the inventorying of the transponder, and wherein the communication station, on correctly receiving a response signal undertakes inventorying of the transponder.

In order to achieve the aforementioned object, features according to the invention are provided in a communication station according to the invention, so that a communication station according to the invention may be characterized as follows:

A communication station for communication with at least one transponder and for inventorying at least one transponder, wherein station transmission means are provided for emitting and receiving signals, and wherein carrier signal generating means are provided for generating an unmodulated carrier signal, the unmodulated carrier signal being emitted by the station transmission means in a communications range, and wherein presence-signaling signal detection means are provided for detecting a presence-signaling signal generated and emitted by the transponder and received by the station transmission means, and wherein inventorying command signal generating means that can be activated as a function of the detection of a presence-signaling signal are provided for generating an inventorying command signal, and wherein response signal detection means are provided for detecting a response signal which is generated and emitted by the transponder in response to a received inventorying command signal and is received by the station transmission means and which permits inventorying of the transponder, and wherein inventorying means are provided for inventorying of the transponder as a function of the correctly received response signal.

In order to achieve the aforementioned object, features according to the invention are provided in a transponder according to the invention, so that a transponder according to the invention may be characterized as follows:

A transponder for communication with a communication station, wherein transponder transmission means are provided for emitting and receiving signals, and wherein carrier signal detection means are provided for detecting an unmodulated carrier signal generated and emitted by the communication station and received by the transponder transmission means, and wherein presence-signaling signal generating means are provided for generating a presence-signaling signal as a function of the detection of an unmodulated carrier signal, and wherein inventorying command signal detection means are provided for detecting an inventorying command signal generated and emitted by the communication station and received by the transponder transmission means, and wherein response signal generating means that can be activated as a function of the detection of an inventorying command signal are provided for generating a response signal permitting the inventorying of the transponder.

In order to achieve the aforementioned object, features according to the invention are provided in an integrated circuit according to the invention, so that an integrated circuit according to the invention may be characterized as follows:

An integrated circuit for a transponder for communication with a communication station, wherein at least one connection is provided for emitting and receiving signals, and wherein carrier signal detection means are provided for detecting an unmodulated carrier signal generated and emitted by the communication station and received via at least one connection, and wherein presence-signaling signal generating means that can be activated as a function of the detection of an unmodulated carrier signal are provided for generating a presence-signaling signal, and wherein inventorying command signal detection means are provided for detecting an inventorying command signal generated and emitted by the communication station and received via at least one connection, and wherein response signal generating means that can be activated as a function of the detection of an inventorying command signal are provided for generating a response signal permitting the inventorying of the transponder.

In terms of circuitry, the provision of the features according to the invention represents a simple way, incurring only a small additional cost, of advantageously combining the advantages of the known TTF-method and those of the known RTF-method in the solutions according to the invention, disadvantages of the known TTF-method and of the known RTF-method at the same time being advantageously avoided. The known solutions ensure a very rapid response by a transponder entering the communications range of a communication station, because the transponder emits its presence-signaling signal immediately, whilst only very low sideband amplitude values are guaranteed because the communication station does not emit an inventorying command signal periodically but only on receiving a presence-signaling signal.

In a method according to the invention it has proved very advantageous if the features as claimed in claim 2 or as claimed in claim 3 or as claimed in claim 4 are additionally provided. Particularly good results are thereby achieved, because a brief presence-signaling signal is advantageous with regard to the shortest possible total inventorying time, because the communication station only has to wait the short time span it takes to receive the presence-signaling signal before generating and emitting the inventorying command signal.

In a method according to the invention the transponder can transmit a presence-signaling signal and its response signal to the communication station by means of just one transmission parameter. It has proved particularly advantageous, however, if the transponder emits a presence-signaling signal by means of a first transmission parameter and a response signal by means of a second transmission parameter. This allows a presence-signaling signal and a response signal to be reliably distinguished or separated from one another.

In a method as described in the previous paragraph it has proved particularly advantageous if one of two different subcarrier frequencies of each subcarrier signal is used, one as first transmission parameter and one as second transmission parameter. This constitutes a particularly simple way of distinguishing and separating a presence-signaling signal and a response signal. It is also possible, however, to use two different methods of coding as different transmission parameters.

The aspects described above and further aspects of the invention will be apparent from the examples of embodiments to be described hereafter and explained with reference to this example of embodiment.

The invention will be further described with reference to examples of embodiments shown in the drawings to which, however, the invention is not restricted.

Figure 1:
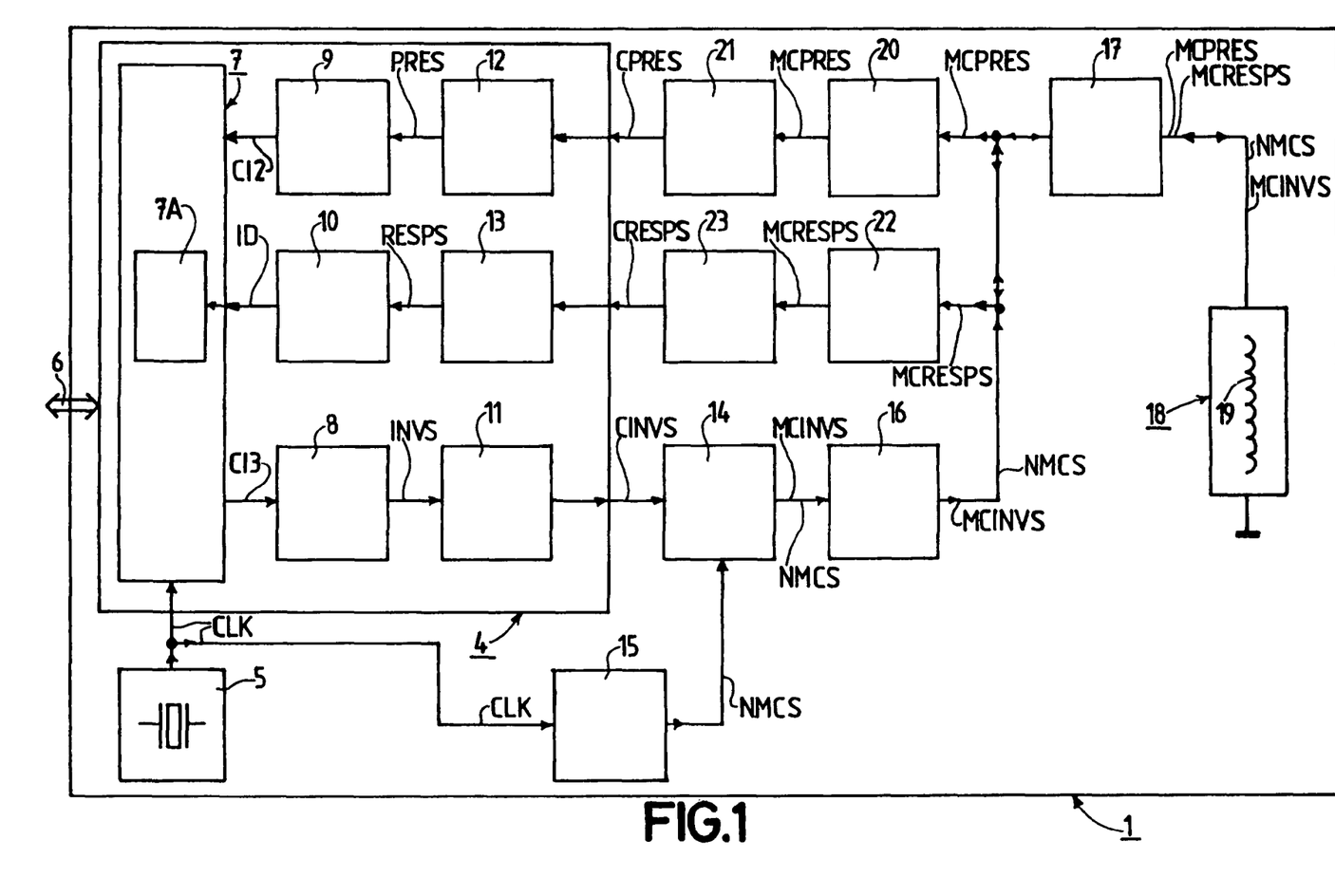
FIG. 1 shows a block circuit diagram of what is, in this context, an essential part of a communication station according to one example of an embodiment of the invention.
Figure 2:
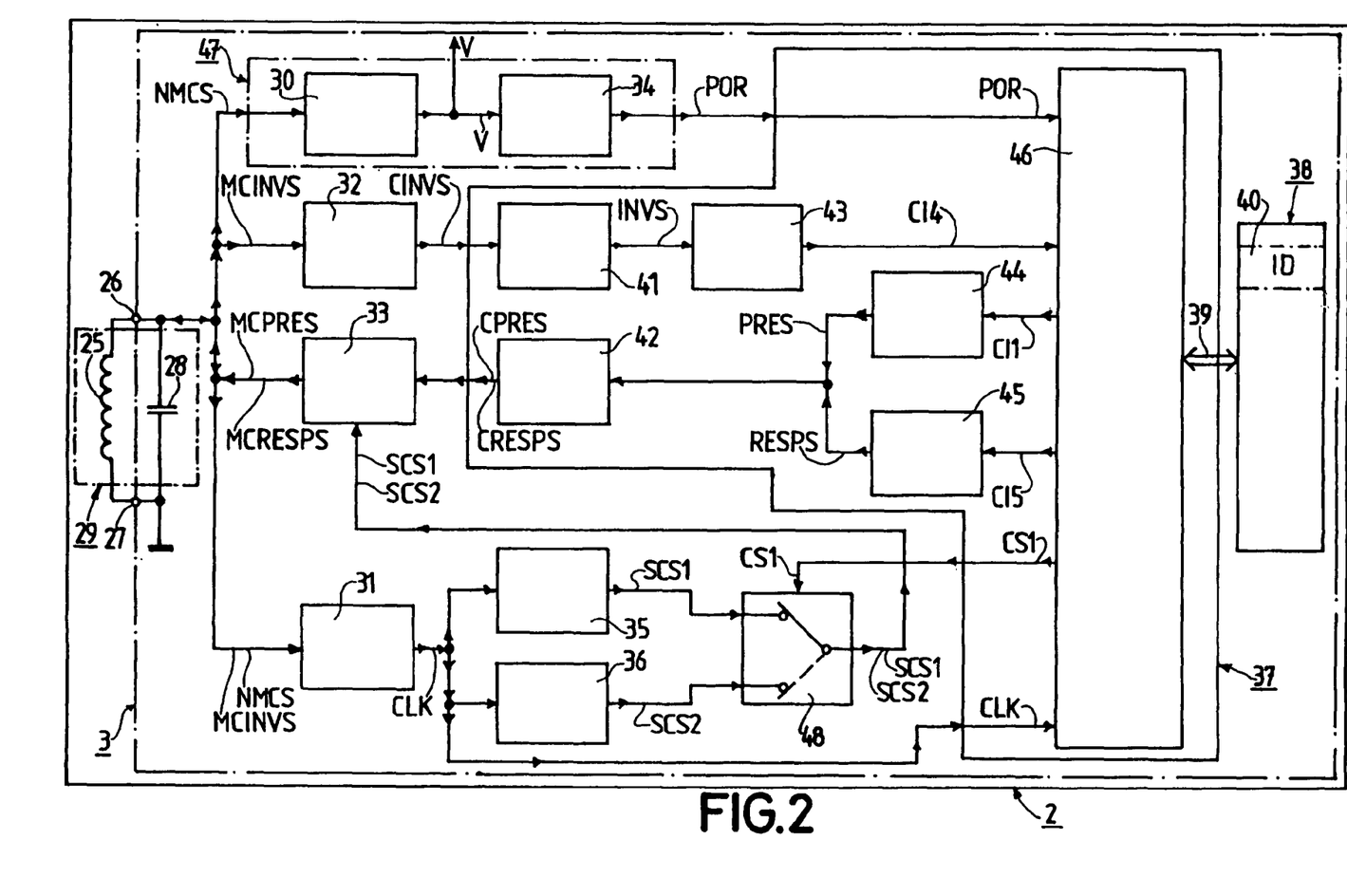
FIG. 2 shows a block circuit diagram of what is, in this context, an essential part of a transponder according to one example of an embodiment of the invention, which comprises an integrated circuit according to one example of an embodiment of the invention.

FIG. 1 shows a communication station 1 and FIG. 2 a transponder 2. The transponder 2 comprises an integrated circuit 3. The communication station 1 and the transponder 2 are designed for contactless communication with one another. The communication station 1 is also designed for inventorying transponders 2. In common applications multiple transponders 2 are in communication with the communication station 1, the transponders 2 being situated within a communications range of the communication station 1. Before being able to read out data contained in each of the transponders 2 or write data to each of the transponders 2, a so-called inventorying of the multiple transponders 2 must be undertaken by means of the communication station 1 in contactless communication with the transponders 2. In the course of such inventorying, for each transponder 2 significant identification data ID for the relevant transponder 2 are transmitted to the communication station 1 by means of a response signal RESPS from the relevant transponder 2 and these data are stored in the communication station 1, so that the identification data ID of all transponders in communication with the communication station 12 are known in the communication station 1, making it possible for the communication station 1, using the identification data ID significant for a transponder 2, to enter specifically and unmistakably into communication with the relevant transponder 2, in order to read out useful data from the relevant transponder 2, for example, or to store useful data to the relevant transponder 2.

The communication station 1 comprises a microcomputer 4. A hard-wired logic circuit may also be provided instead of the microcomputers 4. The communication station 1 further comprises a crystal oscillator 5, by means of which a clock signal CLK can be generated, the clock signal CLK being delivered to the microcomputer 4. The microcomputer 4 is connected via a BUS connection 6 to a HOST computer not shown in FIG. 1, in order to be able to conduct a data exchange between the HOST computer and the microcomputer 4. The microcomputer 4 serves to provide to array of means and functions of which, however, only those means and functions essential in the present context will be explored further.

The microcomputer 4 comprises sequence control means 7 capable of controlling the sequences that can be performed on the microcomputer 4. As part of its sequence control means 7 the microcomputer 4 comprises so-called inventorying means 7A. The microcomputer 4 further comprises command signal generating means 8, which among other things also form inventorying command signal generating means, and presence-signaling signal detection means 9 and response signal detection means 10 and coding means 11 and first decoding means 12 and second decoding means 13. The microcomputer 4 also comprises a series of other signal generating means and signal detection means which, however, will not be examined further here.

The presence-signaling signal detection means 9 serve for detecting presence-signaling signals PRES generated and emitted by transponders 2 and received in the communication station 1. The inventorying command signal generating means in the command signal generating means 8 can be activated as a function of the detection of a presence-signaling signal PRES undertaken by the presence-signaling signal detection means 9 and serve for generating an inventorying command signal INVS. The inventorying command generating means are activated by the sequence control means 7. The response signal detection means 10 serve for detecting response signals RESPS, which are generated and emitted by the transponders 2 in response to an inventorying command signal INVS received in the transponders 2, are received in the communication station 1 and permit inventorying of the transponders 2, together with the identification data ID contained in the said signals. The response signal detection means 10 comprise collision detection means (not shown), which serve to detect a collision between at least two response signals RESPS transmitted at substantially the same time. The inventorying means 7A are intended and designed for inventorying transponders 2 as a function of correctly received response signals RESPS. The coding means 11 serve for coding the signals fed to them and hence also for coding the inventorying command signals INVS. After coding, the coding means 11 emit the duly coded signals that have been fed to them, for example a coded inventorying command signal CINVS. The first decoding means 12 serve for decoding coded presence-signaling signals CPRES fed to them. After decoding, the first decoding means 12 emit the decoded presence-signaling signals PRES. The second decoding means 13 serve for decoding coded response signals CRESPS fed to them. After decoding, the second decoding means 13 emit the decoded response signals RESPS.

The communication station 1 further comprises modulation means 14, to which the coded command signals generated by the coding means 11, that is, for example, the coded inventorying command signal CINVS, can be delivered, and to which an unmodulated carrier signal NMCS can additionally be fed. For generating the unmodulated carrier signal NMCS the communication station 1 comprises carrier signal generating means 15, that is a carrier signal generator 15, to which the clock signal CLK can be fed from the crystal oscillator 5 and which uses the clock signal CLK to generate the unmodulated carrier signal NMCS. Using the coded command signals delivered, the modulation means 14 are capable of modulating the unmodulated carrier signal NMCS, the modulation means 14 after modulation emitting modulated coded command signals, for example the modulated coded inventorying command signal MCINVS. The modulated coded command signals can be fed to amplifying means 16, which amplify the modulated coded command signals. The said modulation of the unmodulated carrier signal NMCS using the coded command signals is performed where the transmission of command signals from the communication station 1 to the transponders 2 is required. Where the transmission of signals from the transponders 2 to the communication station 1 is required, the unmodulated carrier signal NMCS generated by means of the carrier signal generator 15 is relayed in unmodulated form from the modulation means 14 to the amplification means 16. Both the modulated coded command signals and the unmodulated carrier signal NMCS can be fed from the amplification means 16 to signal matching means 17, the signal matching means 17 relaying the modulated coded command signals and the unmodulated carrier signal NMCS fed to them to station transmission means 18, which in this instance comprise a transmission coil 19. The transmission coil 19 is intended for inductive, that is to say mutual coupling with transmission coils of the transponders 2. Instead of the transmission coil 16 the station transmission means 18 may also have a dipole for transmission purposes. Instead of the station transmission means 18 with a transmission coil 19 or a dipole, station transmission means may also be provided which work on a capacitive or optical principle. The station transmission means 18 serve for emission of the unmodulated carrier signal NMCS in the communications range of the communication station 1.

The station transmission means 18 serve not only for emitting signals, that is for transmitting command signals from the communication station 1 to the transponders 2 present in the communications range of the communication station 1, for example, but also for receiving signals which are to be transmitted from the relevant transponders 2 to the communication station 1. For example, presence-signaling signals PRES and response signals RESPS, which contain identification data ID, are to be transmitted from the transponders 2 to the communication station 1. These signals PRES and RESPS are transmitted in such a way that the signals PRES and RESPS are coded, so that coded signals CPRES and CRESPS are obtained and two subcarrier signals SCS1 and SCS2 having different subcarrier frequencies of 283 kHz and 424 kHz are then modulated using the coded signals CPRES and CPRESPS, so that modulated coded signals MCPRES and MCRESPS are received by the station transmission means 18.

The modulated presence-signaling signals MCPRES received are fed from the station transmission means 18 via the signal matching means 17 to first filter means 20, which are tuned to the first subcarrier frequency of 283 kHz and filter out signals in other frequency positions and also interference components and deliver the modulated coded presence-signaling signals MCPRES with interference eliminated to first demodulation means 21. The first demodulation means 21 are designed for demodulation of the modulated coded presence-signaling signals MCPRES fed to them. Following demodulation of the modulated coded presence-signaling signals MCPRES, the first demodulation means 21 deliver coded presence-signaling signals CPRES to the first decoding means 12. Amplification means, which amplify the coded presence-signaling signal CPRES fed to then, may also be connected to the output side of the first demodulation means 21. Yet further filter means, which provide for further filtering and which after filtering deliver the coded presence-signaling signals CPRES to the first decoding means 12, may also be connected to the output side of these amplification means.

The modulated response signals MCRESPS received are fed from the station transmission means 18 via the signal matching means 17 to second filter means 22, which are tuned to the second subcarrier frequency of 424 kHz and filter out signals in other frequency positions and also interference components and which deliver the modulated coded response signals MCRESPS with interference eliminated to second demodulation means 23. The second demodulation means 23 are designed for demodulation of the modulated coded response signals MCRESPS fed to them. After demodulation of the modulated coded response signals MCRESPS the second demodulation means 23 deliver coded response signals CRESPS to the second decoding means 13. Amplification means which amplify the coded response signals CRESPS fed to them may also be connected to the output side of the second demodulation means 23. Yet further filter means, which provide for further filtering and which after filtering deliver the coded response signals CRESPS to the second decoding means 13, may be connected to the output side of these amplification means.

In the second decoding means 13 the coded response signals CRESPS are decoded, the decoding means 13, after decoding, delivering the response signals RESPS to the response signal detection means 10. The response signal detection means 10 serve for detecting both the correct reception of a response signal RESPS and reception susceptible to collision, that is to say incorrect reception of a response signal RESPS. If a collision of response signals RESPS is detected, a new inventorying procedure is initiated by the sequence control means 7. If correct reception of a response signal RESPS is detected, the identification data ID contained in the correctly received response signal RESPS is delivered to the inventorying means 7A. The inventorying data ID are used for inventorying of the relevant transponder, the response signal RESPS from which has been correctly received in the communication station 1. The inventorying means 7A are used to perform functions and sequences familiar to persons skilled in the art, such as the storage of identification data ID and initiating the generation of command signals, such as an acknowledgement command signal or a read command signal or a write command signal.

As already stated, the communication station 1 is intended and designed for contactless communication with a plurality of transponders 2. The transponders 2 are of the same design, which will be described below with reference to the transponder 2 shown in FIG. 2, and are intended and designed for communication with the communication station 1.

In addition to the integrated circuit 3 the transponder 2 comprises a transmission coil 25, which is connected by a first connection 26 and a second connection 27 to the integrated circuit 3. By means of the transmission coil 25 the transponder 2 can communicate by contactless means with the communication station 1 via the transmission coil 19 of the communication station 1. A capacitor 28 contained in the integrated circuit 3 is connected in parallel to the transmission coil 25. The transmission coil 25 and the capacitor 28 form an oscillating circuit, which is tuned to a working frequency and which forms an integral part of the transponder transmission means 29. Instead of the transmission coil 25 the transponder transmission means 29 may also have a dipole for transmission purposes. Instead of the transponder transmission means 29 with a transmission coil 25 or a dipole, transponder transmission means may also be provided which work on a capacitive or optical principle.

The integrated circuit 3 of the transponder 2 and consequently the transponder 2 contain supply voltage generating means 30 and clock signal regeneration means 31 and demodulation means 32 and modulation means 33. These four means 30, 31, 32 and 33 are each connected to the transponder transmission means 29.

The supply voltage generating means 30 serve for generating a supply voltage V using the signals delivered to the supply voltage generating means 30 by the transponder transmission means 29, that is to say using, for example, modulated coded command signals or unmodulated carrier signals NMCS. The supply voltage V that can be generated by the supply voltage generating means 30 can be fed to all those integral parts of the integrated circuit 3 which require this supply voltage V, although this is not separately represented in FIG. 2.

Connected to the supply voltage generating means 30 are "Power-On" detection means 34, to which the output signal of the supply voltage generating means 30, that is the supply voltage V generated at any one time, can be fed. The "Power-On" detection means 34 serve to detect whether a sufficiently high supply voltage V is available. If such a sufficiently high supply voltage V is available, the "Power-On" detection means 34 emit a so-called "Power-On-Reset" signal POR.

The supply voltage generating means 30 and the "Power-On" detection means 34 together form carrier signal detection means 46. The carrier signal detection means 46 are intended to detect an unmodulated carrier signal NMCS generated and emitted by the communication station 1 and received by the transponder transmission means 29 and received via the two connections 26 and 27 in the integrated circuit 3. The carrier signal detection means 46 also serve, however, to detect the reception of a modulated carrier signal, such as the modulated coded inventorying command signal MCINVS.

The clock signal regeneration means 31 serve for regeneration of a clock signal CLK using the signals emitted by the transponder transmission means 29, that is to say using the modulated coded command signals or using the unmodulated carrier signal NMCS, for example. The clock signal regeneration means 31 emit the clock signal CLK. Instead of the clock signal regeneration means 31, an internal oscillator independent of the signals emitted by the transponder transmission means 29 may be provided, by means of which a clock signal CLK can be generated. Such an internal oscillator is particularly advantageous where the communication between a communication station and a transponder occurs at a very high working frequency, for example at working frequencies in the so-called UHF-range or in the microwave-range.

The demodulation means 32 serve for demodulation of command signals fed to them, that is for demodulation of the modulated coded inventorying command signal MCINVS, for example. Following demodulation of a modulated coded inventorying command signal MCINVS, the demodulation means 32 emit a coded inventorying command signal CINVS.

The modulation means 33 serve for modulation of signals, for example the modulation of coded presence-signaling signals CPRES and of coded response signals CRESPS, which can be fed to the modulation means 33. The first subcarrier signal SCS1 with a first subcarrier frequency of 283 kHz and the second subcarrier signal SCS2 with a second subcarrier frequency of 424 kHz may furthermore also alternatively be fed to the modulation means 33. For generating the first subcarrier signal SCS1 a first subcarrier signal generator 35 is provided, to which the clock signal CLK from the clock signal regeneration means 31 can be fed and which generates the first subcarrier signal SCS1 using the clock signal CLK. For generating the second subcarrier signal SCS2 a second subcarrier signal generator 36 is provided, to which the clock signal CLK from the clock signal regeneration means 31 can likewise be fed and which generates the second subcarrier signal SCS2 using the clock signal CLK. Connected to the two subcarrier signal generators 35 and 36 on the output side are subcarrier signal switching means 48, to which a control signal CS1 having two different signal states can be fed and by means of which either the first subcarrier signal SCS1 or the second subcarrier signal SCS2 can be fed to the modulation means 33, depending on the signal state of the control signal CS1 supplied.

Where modulation is performed as a function of the coded presence-signaling signal CPRES, the first subcarrier signal SCS1 is fed to the modulation means 33 and is modulated by the modulation means 33 as a function of the coded presence-signaling signal CPRES, so that as a result the modulation means 33 emit a modulated coded presence-signaling signal MCPRES, which is subsequently transmitted to the communication station 1 by means of the transponder transmission means 29 and in this case in particular by means of the transmission coil 25.

Where modulation is performed as a function of the coded response signal CRESPS, the second subcarrier signal SCS2 is fed to the modulation means 33 and is modulated by the modulation means 33 as a function of the coded response signal CRESPS, so that as a result the modulation means 33 emit a modulated coded response signal MCRESPS, which is subsequently transmitted to the communication station 1 by the transponder transmission means 29 and in this case in particular by means of the transmission coil 25.

The transponder 2 is therefore designed to generate a modulated coded presence-signaling signal MCPRES with a first transmission parameter, that is with the first subcarrier frequency of 848 kHz, and to generate a modulated coded response signal MCRESPS with a second transmission parameter, that is with the second subcarrier frequency of 424 kHz.

The integrated circuit 3 of the transponder 2 and consequently the transponder 2 comprise a microcomputer 37. Instead of the microcomputer 37 a hard-wired logic circuit may also be provided. The microcomputer 37 provides a number of means and functions, of which, however, only those means and functions essential in the present context will be explored further below. The "Power-On-Reset" signal POR and the clock signal CLK can be fed to the microcomputer 37 for purposes long known to persons skilled in the art.

The integrated circuit 3 further comprises storage means 38, which are connected to the microcomputer 37 via a connection 39. The storage means 38 comprise a plurality of storage areas, of which only one storage area 40 is indicated by means of dot-and-dash lines. Distinctive identification data ID significant for the transponder 2 are stored in the storage area 40. A series of other data, which will not explored further however, are stored in the storage means 38.

The microcomputer 37 provides decoding means 41 and coding means 42. The decoding means 41 are intended for decoding command signals fed to them, that is also for decoding a coded inventorying command signal CINVS. After decoding the coded command signals, the decoding means 40 emit decoded command signals, such as the inventorying command signal INVS. The coding means 42 serve for coding signals, for example for coding the response signal RESPS. After coding of the response signal RESPS, the coding means 42 emit a coded response signal CRESPS.

The microcomputer 37 further provides inventorying command signal detection means 43 and presence-signaling signal generating means 44 and response signal generating means 45. The function of the means 43, 44 and 45 is examined in more detail below. The microcomputer 37 further comprises sequence control means 46, which serve for controlling the sequences that can be performed in the microcomputer 37.

The inventorying command signal detection means 43 are intended and designed to detect the inventorying command signal INVS that is generated and emitted by the communication station 1, received by the transponder transmission means 29, fed to the integrated circuit 3 via the connections 26 and 27 and delivered to the inventorying command signal detection means 43. When the inventorying command signal detection means 43 detect an inventorying command signal INVS, the inventorying command signal detection means 43 emit control information, which is examined in more detail below.

The presence-signaling signal generating means 44 can be activated as a function of the detection of an unmodulated carrier signal NMCS undertaken by the carrier signal detection means 46 and are intended and designed to generate the presence-signaling signal PRES. The presence-signaling signal generating means 44 are activated by the sequence control means 46. The presence-signaling signal PRES is only a relatively short signal, which is formed by a bit sequence only a few bits long. The presence signaling signal PRES, however, may be formed by a so-called burst or by a so-called code-infringement. This signal may also consist of just a single bit, although there is then a relatively high susceptibility to interference. The presence-signaling signal PRES serves to inform the communication station 1 very swiftly of the presence of a transponder 2 in the communications range of the communication station 1. The presence-signaling signal PRES has a signal duration of approximately 75.0 microseconds.

The response signal generating means 45 can be activated as a function the detection of an inventorying command signal INS undertaken by the inventorying command signal detection means 43 and are intended and designed to generate the response signal RESPS. The response signal generating means 45 are activated by the sequence control means 46. In order to be able to generate this response signal RESPS, the identification data ID read out of the storage area 40 of the storage means 38 are fed to the response signal generating means 45. The response signal RESPS is generated by means of the identification data ID and additional data, such as security data. The response signal RESPS is a signal of relatively long duration, because the response signal RESPS comprises the identification data ID and additional data such as security data, so that the response signal RESPS comprises, for example, a total of 16 bytes. However, the response signal RESPS may also comprise only 8 bytes or 64 bytes. In this instance the response signal RESPS has a signal duration of approximately 2.19 milliseconds. The response signal RESPS generated by the response signal generating means 45, which comprises the identification data ID, must be transmitted from the transponder 2 to the communication station 1 for inventorying purposes and permits inventorying of the transponder 2 by the communication station 1.

In this instance the transponder 2 is therefore designed to generate a presence-signaling signal PRES with a first signal duration and to generate a response signal RESPS with a second signal duration, the first signal duration being shorter than the second signal duration. This is so designed that the first signal duration and the second signal duration have a ratio of 1:X, it being particularly advantageous if the selected value of X is X=29.

In this instance the communication station 1 and the transponder 2 are designed so that in inventorying of the transponders 2 inventorying sequences are performed in succession, a number of time slots being defined in the course of each inventorying sequence. Time slot selection means serve to determine in which of the time slots the response signal RESPS is relayed from the response signal generating means 45 to the coding means 42 and consequently fed to the modulation means 33, and hence is transmitted from the transponder 2 to the communication station 1. The time slot selection means are therefore capable of selecting one time slot from a plurality of time slots, it being possible to transmit the response signal RESPS generated to the communication station 1 using the time slot selected.

A method of inventorying transponders 2 according to FIG. 2 by means of the communication station 1 according to FIG. 1 is described below.

As soon as the communication station 1 is activated, the communication station 1, by means of the carrier signal generator 15, generates the unmodulated carrier signal NMCS, which is fed to the modulator 14, to which in this case no further signals are fed, so that the modulator 14 delivers the unmodulated carrier signal NMCS to the amplification means 16. As a result the communication station 1, by means of the station transmission means 18, constantly emits the unmodulated carrier signal NMCS in the communications range of the communication station 1.

As soon as a transponder 2 enters the communications range of the communication station 1 the transponder 2, by way of the transponder transmission means 29, receives the unmodulated carrier signal NMCS, with the result that the reception of the unmodulated carrier signal NMCS is detected by the carrier signal detection means 46, so that the carrier signal detection means 46 deliver the "Power-On-Reset" signal POR to the microcomputer 37 and in the microcomputer 37 to the sequence control means 46. Consequently, the sequence control means 46 activate the presence-signaling signal generating means 44 by means of first control information CI1, so that the presence-signaling signal generating means 44 generate a presence-signaling signal PRES and deliver this to the coding means 42. As a result the coding means 42 deliver a coded presence-signaling signal CPRES to the modulation means 33. The delivery of the "Power-On-Reset"-signal POR to the sequence control means 46 furthermore causes the sequence control means 46 to deliver the control signal CS1 to the subcarrier signal switching means 48 with a signal state such that the subcarrier signal switching means 48 connect the first subcarrier signal generator 35 to the modulation means 33. As a result the first subcarrier signal SCS1 with a subcarrier frequency of 848 kHz is modulated as a function of the coded presence-signaling signal CPRES. As a result the modulation means 33 deliver a modulated coded presence-signaling signal MCPRES to the transponder transmission means 29, so that the transponder 2, on entering the communications range of the communication station 1, emits the modulated coded presence-signaling signal MCPRES in the communications range of the communication station 1.

As a result the communication station 1 receives the modulated coded presence-signaling signal MCPRES by way of the station transmission means 18, following which the modulated coded presence-signaling signal MCPRES received is fed via the signal matching means 17 to the first filter means 20, these first filter means 20 affording provision for filtering. A demodulation of the modulated presence-signaling signal MCPRES received is subsequently undertaken by the first demodulation means 21, so that the first demodulation means 21 deliver the coded presence-signaling signal CPRES to the first decoding means 12. The first decoding means 12 provide for decoding, following which the first decoding means 12 deliver the presence-signaling signal PRES to the presence-signaling signal detection means 9. The presence-signaling signal detection means 9 detect the presence-signaling signal PRES and subsequently deliver second control information CI2 to the sequence control means 7. As a result the sequence control means 7 activate the command signal generating means 8 by means of third control information CI3, in such a way that the inventorying command signal generating means contained in the command signal generating means 8 generate an inventorying command signal INVS. The inventorying command signal INVS generated is fed to the coding means 11, so that the coding means 11 deliver a coded inventorying command signal CINVS to the modulation means 14. As a result the modulation means 14 deliver a modulated coded inventorying command signal MCINVS to the amplification means 16, which deliver this signal to the signal matching means 17, the signal matching means 17 supplying the station transmission means 18 with the modulated coded inventorying command signal MCINVS. As a result, on receiving a presence-signaling signal PRES, the communication station 1, by way of the station transmission means 18, emits a modulated coded inventorying command signal MCINVS in the communications range of the communication station 1.

The modulated coded inventorying command signal MCINVS emitted by the communication station 1 is received by the transponder transmission means 29 and fed to the demodulation means 32. As a result, after demodulation, the demodulation means 32 deliver the coded inventorying command signal CINVS to the decoding means 41, which after decoding deliver the inventorying command signal INVS to the inventorying command signal detection means 43. The inventorying command signal detection means 43 detect the inventorying command signal INVS fed to them, with the result that the inventorying command signal detection means 43 deliver fourth control information CI4 to the sequence control means 46. This in turn means that the sequence control means 46 activate the response signal generating means 45 by means of fifth control information CI5, so that the response signal generating means 45 generate the response signal RESPS incorporating the identification data ID and deliver this to the coding means 42, the coding means 42, after coding, delivering the coded response signal CRESPS to the modulation means 33. The delivery of the fourth control information CI4 to the sequence control means 46 furthermore means that the sequence control means 46 deliver the control signal CS1 to the subcarrier signal switching means 48 with a signal state such that the subcarrier signal switching means 48 connect the second subcarrier signal generator 35 to the modulation means 33. As a result the second subcarrier signal SCS2 with a subcarrier frequency of 424 kHz is modulated as a function of the coded response signal CRESPS, so that the modulation means 33 subsequently deliver the modulated coded response signal MCRESPS to the transponder transmission means 29. As a result the transponder 2, on receiving the inventorying command signal INVS, emits a response signal RESPS permitting inventorying of the transponder 2 in the communications range of the communication station 1.

The modulated coded response signal MCRESPS emitted by the transponder 2 is received by the station transmission means 18, following which the modulated coded response signal MCRESPS received is fed to the second filter means 22 via the signal matching means 17, the second filter means 22 affording provision for filtering. A demodulation of the modulated response signal MCRESPS received is subsequently undertaken by the second demodulation means 23, so that the second demodulation means 23 deliver the coded response signal CRESPS to the second decoding means 13. The second decoding means 13 provide for decoding, following which the second decoding means 13 deliver the response signal RESPS to the response signal detection means 10. Should a further response signal RESPS from another transponder 2 collide with the response signal RESPS received, this is detected by the collision detection means contained in the response signal detection means 10, following which the transponders in question are requested by means of a separate command signal to emit a fresh response signal RESPS. If, on the other hand, only one response signal RESPS is received from one transponder 2 according to FIG. 2, this response signal RESPS is detected by the response signal detection means 10, with the result that the identification data ID contained in the response signal RESPS and significant for the transponder 2 in question are relayed to the inventorying means 7A. The inventorying means 7A consequently undertake inventorying of the relevant transponder 2. This means, in other words, that on correct reception of a response signal RESPS the communication station 1 undertakes inventorying of the relevant transponder 2, the response signal RESPS from which has been correctly received and detected.

It should be mentioned here that instead of the carrier signal detection means 47, which are provided by the supply voltage generating means 30 and the "Power-On" detection means 34, a simple HF detector may also be provided as carrier signal detection means, the said HF detector being capable of detecting the presence of the unmodulated carrier signal NMCS. Such a design is advantageous particularly where the transponder is a so-called active transponder, in which the supply voltage is obtained from a built-in battery and not from supply voltage generating means 30, which generate the necessary supply voltage V from a received signal, such as the unmodulated carrier signal NMCS received.

It should be further mentioned that in the aforementioned design of the communication station 1 and the transponder 2 the chosen value of the ratio X between the first signal duration of the presence-signaling signal PRES and the second signal duration of the response signal RESPS is X=29. This need not necessarily be the case, since other values of the ratio X may advantageously be used, for example ratio values X in a range between X=20 and X=35. However, other values for the ratio X in a range between X=10 and X=100 may also be advantageous in various applications.

In the case described above all identification data ID are incorporated into one response signal RESPS. This need not necessarily be the case, since only some of the identification data ID may be used to form a response signal RESPS. The identification data ID are also often referred to as serial numbers.

In the case described above the transponder 2 emits the presence-signaling signal PRES in the communications range of the communication station 1 only once. In this context a situation can arise in which the transponder 2 is still at such a great distance from the communication station 1 that although the transponder 2 receives the unmodulated carrier signal NMCS emitted by the communication station 1, the presence-signaling signal PRES which it generates and emits is not yet received by the communication station 1, because this presence-signaling signal PRES has a significantly lower level than the unmodulated carrier signal NMCS. In order to avert the difficulties arising from this, in an improved design variant of the method, the communication station 1 and the transponder 2 described above, it is proposed that the transponder 2, on receiving an unmodulated carrier signal NMCS, should not generate the presence-signaling signal PRES just once, but that after generating the presence-signaling signal PRES for the first time the transponder 2 after a certain interval should generate this presence-signaling signal PRES a second time or at random intervals or repeatedly at recurrent intervals, so as to ensure that the communication station 1 reliably receives a presence-signaling signal PRES generated and emitted by the transponder 2. It has proved particularly advantageous in this case to define a termination condition in the transponder 2, which ensures that on receipt of an inventorying command signal INVS in the transponder 2 the repeated generation and emission of the presence-signaling signal PRES is terminated.

The invention claimed is:

1. A method of inventorying at least one transponder by means of a communication station, wherein the communication station emits an unmodulated carrier signal in a communications range, and wherein the transponder on entering the communications range generates a presence-signaling signal and emits the presence-signaling signal in the communications range, and wherein the communication station on receiving a presence-signaling signal emits an inventorying command signal in the communications range, and wherein the transponder on receiving the inventorying command signal emits a response signal in the communications range permitting the inventorying of the transponders, and wherein the communication station, on correctly receiving a response signal undertakes inventorying of the transponders, wherein the transponder emits the presence-signaling signal with a first signal duration and the response signal with a second signal duration, and wherein the first signal duration is shorter than the second signal duration, wherein the first signal duration and the second signal duration have a ratio of 1:X, and in that the value X lies in a range between X=10 and X=100, wherein the presence-signaling signal is not assigned to the transponder.

2. A method as claimed in claim 1, wherein the transponder emits a presence-signaling signal with a first transmission parameter and a response signal with a second transmission parameter.

3. A method as claimed in claim 2, wherein one of two different subcarrier frequencies of each subcarrier signal is used, one as first transmission parameter and one as second transmission parameter, wherein the two different subcarrier frequencies are 283 kilohertz and 424 kilohertz.

4. A transponder for communication with a communication station, wherein transponder transmission means are provided for emitting and receiving signals, and wherein carrier signal detection means are provided for detecting an unmodulated carrier signal generated and emitted by the communication station and received by the transponder transmission means, and wherein presence-signaling signal generating means that can be activated as a function of the detection of an unmodulated carrier signal are provided for generating a presence-signaling signal, and wherein inventorying command signal detection means are provided for detecting an inventorying command signal generated and emitted by the communication station and received by the transponder transmission means, and wherein response signal generating means that can be activated as a function of the detection of the inventorying command signal are provided for generating a response signal permitting the inventorying of the transponder, wherein the presence-signaling signal generating means generates the presence-signaling signal with a first signal duration and wherein the response signal generating means generates the response signal with a second signal duration, and wherein the first signal duration is shorter than the second signal duration, wherein the first signal duration and the second signal duration have a ration of 1:X, the value X lying in a range between X=10 and X=100, wherein the presence-signaling signal is not assigned to the transponder.

5. A transponder as claimed in claim 4, wherein the transponder is designed to generate a presence-signaling signal with a first transmission parameter and to generate a response signal with a second transmission parameter.

6. A transponder as claimed in claim 5, wherein the first transmission parameter and the second transmission parameter are each formed by one of two different subcarrier frequencies of each subcarrier signal.

7. An integrated circuit for a transponder for communication with a communication station, wherein at least one connection is provided for emitting and receiving signals, and wherein carrier signal detection means are provided for detecting an unmodulated carrier signal generated and emitted by the communication station and received via at least one connection, and wherein presence-signaling signal generating means that can be activated as a function of the detection of an unmodulated carrier signal are provided for generating a presence-signaling signals, and wherein inventorying command signal detection means are provided for detecting an inventorying command signal generated and emitted by the communication station and received via at least one connection, and wherein response signal generating means that can be activated as a function of the detection of the inventorying command signal are provided for generating a response signal permitting the inventorying of the transponder, wherein the presence-signaling signal generating means generates the presence-signaling signal with a first signal duration and wherein the response signal generating means generates the response signal with a second signal duration, and wherein the first signal duration is shorter than the second signal duration, wherein the first signal duration and the second signal duration have a ratio of 1:X, and in that the value X lies in a range between X=10 and X=100, wherein the presence-signaling signal is not assigned to the transponder.

8. An integrated circuit as claimed in claim 7, wherein the value X lies in a range between X=20 and X=35.

9. An integrated circuit as claimed in claim 7, wherein the integrated circuit is designed to generate a presence-signaling signal with a first transmission parameter and to generate a response signal with a second transmission parameter.

10. An integrated circuit as claimed in claim 9, wherein the first transmission parameter and the second transmission parameter are each formed by one of two different subcarrier frequencies of each subcarrier signal.

11. A method as claimed in claim 1, wherein the presence-signaling signal does not include an identification data ID of the transponder and wherein the response signal includes the identification data ID of the transponder.

12. A transponder as claimed in claim 4, wherein the presence-signaling signal does not include an identification data ID of the transponder.

13. An integrated circuit as claimed in claim 7, wherein the presence-signaling signal does not include an identification data ID of the transponder.

14. A method as claimed in claim 1, wherein the transponder on entering the communications range generates and emits a plurality of presence-signaling signals in the communications range at random intervals to ensure that the communication station reliably receives at least one of the plurality of presence-signaling signal generated and emitted by the transponder.

15. A method as claimed in claim 14, wherein the transponder terminates generation and emission of the plurality of presence-signaling signals on receiving the inventorying command signal.

16. A method as claimed in claim 1, wherein the transponder on entering the communications range generates and emits a plurality of presence-signaling signals in the communications range repeatedly at recurrent intervals to ensure that the communication station reliably receives at least one of the plurality of presence-signaling signal generated and emitted by the transponder.

* * * * *